US012752939B2

(12) United States Patent
Humann

(10) Patent No.: US 12,752,939 B2
(45) Date of Patent: Oct. 6, 2026

(54) SLIP-THROUGH TETHER AND ATTACHMENT SYSTEM FOR ROBOT MOVEMENT ALONG A TETHER

(71) Applicant: U.S. Army DEVCOM, Army Research Laboratory, Adelphi, MD (US)

(72) Inventor: James D. Humann, Los Angeles, CA (US)

(73) Assignee: America as represented by the Secretary of the Army, Washington, DC (US)

( * ) Notice: Subject to any disclaimer, the term of this patent is extended or adjusted under 35 U.S.C. 154(b) by 886 days.

(21) Appl. No.: 18/113,259

(22) Filed: Feb. 23, 2023

(65) Prior Publication Data

US 2024/0286773 A1 Aug. 29, 2024

(51) Int. Cl.
*B64U 10/60* (2023.01)
*B64F 3/02* (2006.01)
*B64U 50/35* (2023.01)

(52) U.S. Cl.
CPC ................ *B64U 10/60* (2023.01); *B64F 3/02* (2013.01); *B64U 50/35* (2023.01)

(58) Field of Classification Search
CPC ........ B64U 10/60; B64U 50/35; B64U 50/34; B64U 2201/202; B64F 3/02; B64C 39/022; G05D 1/0866
See application file for complete search history.

(56) References Cited

U.S. PATENT DOCUMENTS

| | | | | |
|---|---|---|---|---|
| 10,011,352 | B1 * | 7/2018 | Dahlstrom | B64U 10/60 |
| 11,040,773 | B2 * | 6/2021 | Furukawa | B64U 10/60 |
| 12,202,635 | B1 * | 1/2025 | Dahlstrom | G05D 1/104 |
| 12,358,643 | B2 * | 7/2025 | Mathew | H01B 11/002 |
| 2015/0274294 | A1 * | 10/2015 | Dahlstrom | B05B 13/0278 239/722 |
| 2019/0106212 | A1 * | 4/2019 | Furukawa | B65H 75/4484 |
| 2021/0316858 | A1 * | 10/2021 | Pargoe | B64U 10/14 |
| 2022/0023685 | A1 * | 1/2022 | Nohmi | B64U 10/13 |
| 2022/0236745 | A1 * | 7/2022 | Fagiano | G05D 1/085 |
| 2022/0258861 | A1 * | 8/2022 | Fagiano | B64U 10/16 |

* cited by examiner

*Primary Examiner* — Zachary L Kuhfuss
(74) *Attorney, Agent, or Firm* — Alan I. Kalb

(57) ABSTRACT

A powered drone tether and deployment system including a plurality of drone coupling/decoupling mechanisms which enable the coupling/decoupling thereto of rechargeable drones in flight. A lead drone may carry the drone tether so as to extend the tether from a base station supplying power thereto such that one or more rechargeable drones may attach to coupling/decoupling mechanisms for charging, and then detach from the coupling/decoupling mechanisms to perform independent flight tasks.

7 Claims, 5 Drawing Sheets

SLIP-THROUGH TETHER AND ATTACHMENT SYSTEM FOR ROBOT MOVEMENT ALONG A TETHER

GOVERNMENT INTEREST

The invention described herein may be manufactured and used by or for the Government of the United States for all governmental purposes without the payment of any royalty.

FIELD OF THE DISCLOSURE

The present disclosure relates generally to a drone and tether system for transmitting power and/or data from a source to one or more drones capable of detaching from and reattaching to the tether via drone coupling/decoupling mechanisms.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Tethered drones comprise one or more drones that are connected to fixed length tethers or cables that are in turn connected to a ground-based anchor. Advantageously, tethered drones are well suited for long duration surveillance due to receiving power via the tether. Improvements are desired.

SUMMARY OF THE INVENTION

Various deficiencies in the prior art are addressed below by the disclosed systems, methods and apparatus comprising a connect/disconnect system configured for connecting/disconnecting unmanned aerial vehicles (UAVs) or "drones" to/from docking points of a flexible tether configured to provide charging power and, optionally, data connections to UAVs connected thereto. In various embodiments, a connected drone can intermittently draw power from the tether via the docking point connection, disconnect and move relative to the tether, and reconnect at a different docking point on the tether, wherein the tether has multiple discrete docking points along its length.

Various embodiments provide a powered drone tether or tether deployment system including a plurality of drone coupling/decoupling mechanisms which enable the coupling/decoupling thereto of rechargeable drones in flight. In some embodiments a first or tether or lead drone carries the drone tether so as to extend the powered tether from a base station supplying power thereto such that one or more rechargeable drones may attach to coupling/decoupling mechanisms for charging and then detach from the coupling/decoupling mechanisms to then perform independent flight tasks.

A drone tether cable according to an embodiment comprises power input connectors configured to be electrically coupled to a power source; at least two power conductors electrically coupling the power input connectors to each of a plurality of docking points distributed along the tether cable; each docking point comprising docking point coupling elements configured to engage with corresponding drone coupling elements; each docking point comprising power connection elements configured to electrically cooperate with corresponding power connection elements of a drone, the orientation of the power connection elements being established by the orientation of the coupling elements. The docking point coupling elements and drone coupling elements may comprise magnetic coupling elements and/or other types of coupling elements.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

Figure 1:
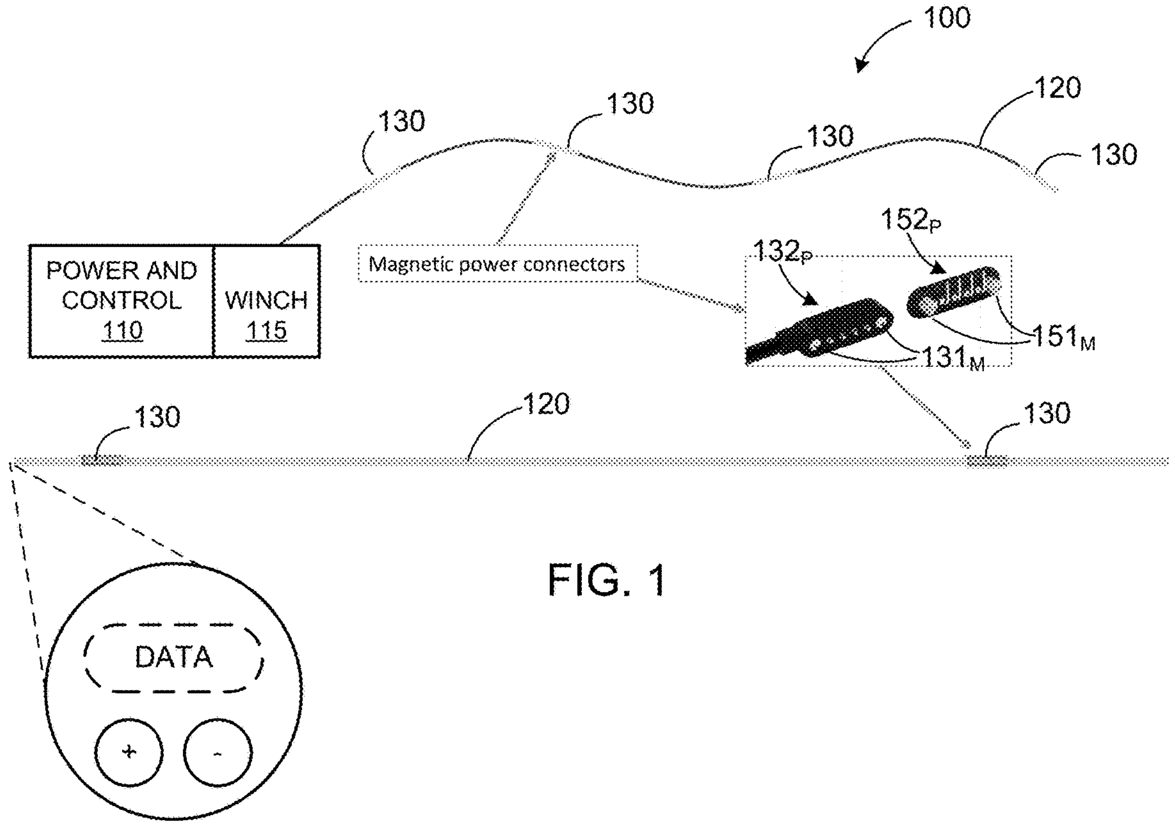
FIGS. 1-2 schematically depict a powered tether system having magnetic power couplings according to an embodiment.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for illustrative purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments, such as seismology and data fusion.

Various embodiments provide a connect/disconnect system configured for connecting/disconnecting unmanned aerial vehicles (UAVs) or "drones" to/from docking points of a flexible tether configured to provide charging power and, optionally, data connections to drones connected thereto. In various embodiments, a connected drone can intermittently draw power from the tether via the docking point connection, disconnect and move relative to the tether, and reconnect at a different docking point on the tether. As noted above, various embodiments provide for a non-detachable lead drone configured to rapidly deploy the tether so as to rapidly expose docking points to non-lead drones, which may then attach/detach as needed (e.g., charge batteries, exchange data with ground equipment, and so on).

Various embodiments provide a drone and tether system for transmitting power and/or data from a source to one or more drones capable of detaching from and reattaching to the tether via drone coupling/decoupling mechanisms, the drone tether including a plurality of docking points having drone coupling/decoupling mechanisms which enable the coupling/decoupling thereto of rechargeable drones in flight. In some embodiments, a first or tether or lead drone carries the powered drone tether so as to extend the powered tether from a base station supplying power thereto such that one or more rechargeable drones may attach to coupling/decoupling mechanisms for charging and then detach from the coupling/decoupling mechanisms to perform independent tasks or move relative to the tether.

Figure 2:
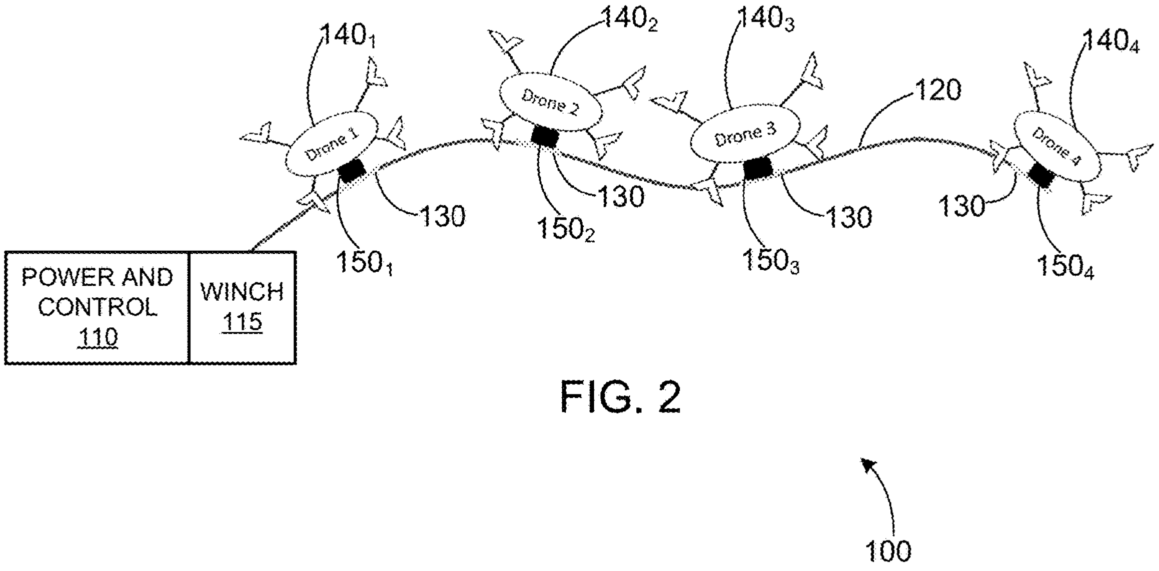

FIGS. 1-2 schematically depict a powered tether system having magnetic power couplings according to an embodiment. Specifically, FIGS. 1-2 depicts a powered tether system 100 comprising a ground power and control source 110 coupled to a tether 120 having a plurality of docking points 130 embedded at intervals along the length of the tether 120. The tether 120 includes two or more power conductors embedded therein and configured to deliver electrical power from the ground power and control source 110 to the docking points 130 such that drones 140 attaching to the docking points 130 may be recharged thereby. In various embodiments, the tether 120 includes data cabling (not shown) configured to enable data transfer between the ground power and control source 110 and docking points 130 such that drones 140 attaching to the docking points 130 may transfer data to/from the ground power and control source 110 thereby.

As shown in FIGS. 1-2, each of the docking points 130 is associated with a respective magnetic connector, illustratively a multiterminal connector having a plurality of magnetic coupling elements $\mathbf{131}_M$ and a plurality of power connection elements $\mathbf{132}_P$. The magnetic coupling elements $\mathbf{131}_M$ of the docking points 130 are configured to magnetically engage with corresponding magnetic coupling elements $\mathbf{151}_M$ of drone connectors 150.

In operation, a drone 140 having a tether connector 150 including fixed connectors/couplers or magnetic coupling elements $\mathbf{151}_M$ hovers near a docking point 130 such that the magnetic coupling elements $\mathbf{131}_M/\mathbf{151}_M$ engage with each other to align and couple together the respective power connection elements $\mathbf{132}_P/\mathbf{152}_P$ to thereby effect delivery of a charging current to the drone 140 from the ground power and control source 110 via the tether 120. The docking points 130 are preferably inert until a drone 140 is attached thereto. The docking points 130 allow for quick connect and disconnect, with no moving parts on the tether side.

Various embodiments contemplate that docking points 130 including such magnetic power conductors are attached to the tether 120 at a minimum distance from each other as appropriate to the size of the drones 140 to be charged thereby.

Various embodiments contemplate that a winch 115 is used to control an amount of tether to be extended from, illustratively, a winch 115 associated with a tether cable mount on the ground or on the ground power and control source 110. For example, the fourth drone $\mathbf{140}_4$ depicted in FIG. 2 may comprise a service drone configured to extend the end of the tether to a specific programmed location, or in a specific direction, wherein the amount of tether 120 extended thereby is controlled via the winch 115 associated with the tether cable mount.

Various embodiments contemplate that drones 140 have tether connectors 150 configured to enable the drone 140 to move along the tether 120 such as by sliding along the tether 120. That is, in a clamped mode of operation the tether connector 150 is configured to attach itself to a docking point 130 as described herein, whereas in an unclamped mode of operation the tether connector 150 is configured to detach itself from the docking point 130 while remaining slidably engaged with the tether 120, as will be described in more detail below. That is, the drone 140 alternately clamps and unclamps its tether connecter and, when unclamped, the drone 140 may slide along the tether and move to new docking points 130.

Several slip-through connection mechanisms are contemplated to enable the drone(s) to be slideably engaged with the tether cable; namely, a "roll through" mechanism, and a "slide through" mechanism. Other mechanisms may also be employed for this function. This movement to new docking points, combined with the functionality of the winch 115, enables control of the length of tether segments between specific drones.

Various embodiments contemplate a tether 120 wherein a lead drone $\mathbf{140}_4$ is configured to remain attached to the tether and pull/extend the tether 120 so as to rapidly deploy the tether 120 (e.g., under control of a winch 115 configured to maintain an appropriate tension while feeding the tether out toward the lead drone) to an operation length/height and thereby exposing the various docking points 130 along the tether 120 so that other drones 140 may attach thereto as needed. It is noted that the distance between docking points 130 along the tether 120 may be fixed may or may vary, such as may be appropriate for a particular task.

Figure 3:
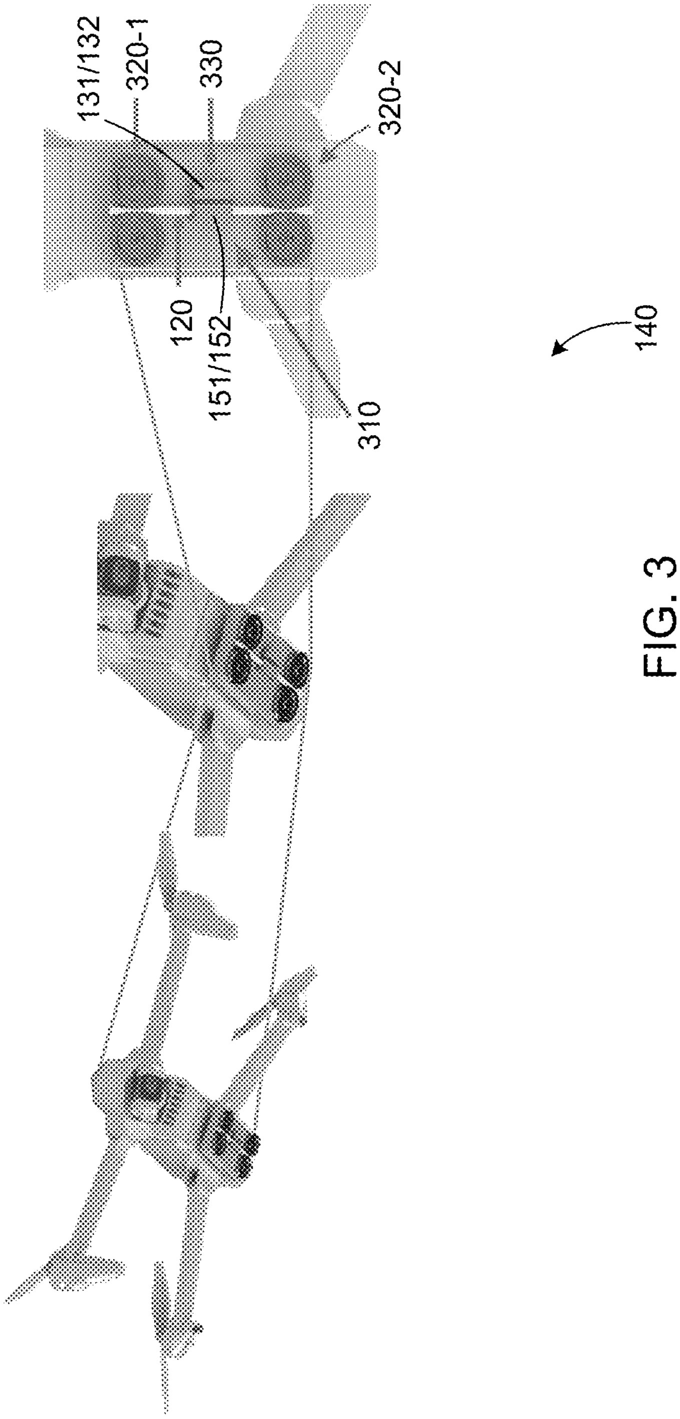
FIG. 3 depicts a roll-through connection mechanism according to an embodiment.

FIG. 3 depicts a roll-through connection mechanism according to an embodiment. Specifically, the drone 140 of FIG. 3 includes a tether connector 150 comprising a base 310, first 320-1 and second 320-2 pairs of rolling wheels or guide wheels, and magnetic power connectors 330. As depicted in FIG. 3, the tether 120 is engaged by each of the first 320-1 and second 320-2 pairs of rolling wheels such that the drone 140 may move forward or backward along the tether 120 such that, when the drone tether connector 150 is aligned with a tether docking point 130, the drone magnetic coupling elements 151 may engage with tether magnetic coupling elements 131 so as to connect drone power connection elements 152 and tether power connection elements 132.

Figure 4:
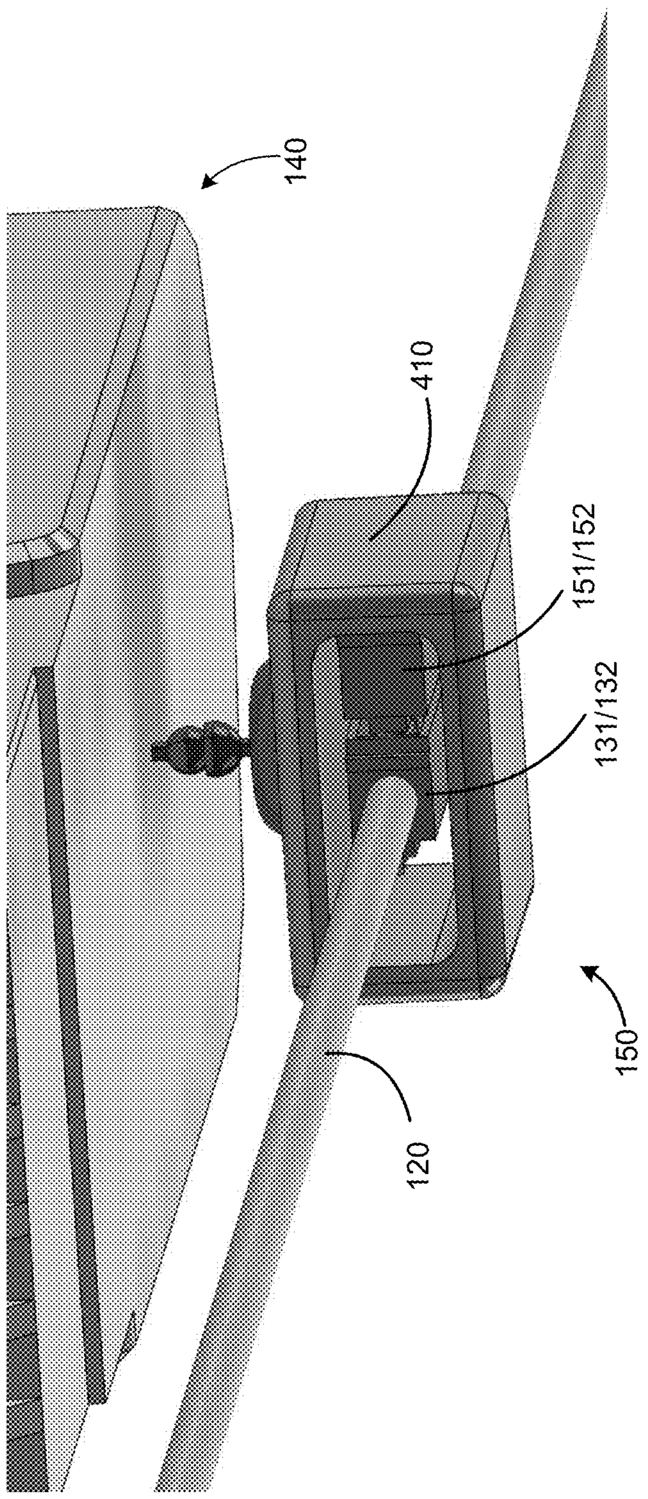
FIGS. 4-5 depict slip-through connection mechanisms according to various embodiments.

FIG. 4 depicts a slip-through connection mechanism according to an embodiment. Specifically, the drone 140 of FIG. 4 includes a tether connector 150 comprising one or more pass-through mechanisms 410, illustratively rectilinear, rounded, or other cable capture mechanisms (box, ring, etc.) sized to enable the drone to move along the tether, and at least one magnetic power connector positioned to engage with docking points 130 along the tether 120 (e.g., within, proximate to, or between the one or more pass-through mechanisms 410).

Figure 5:
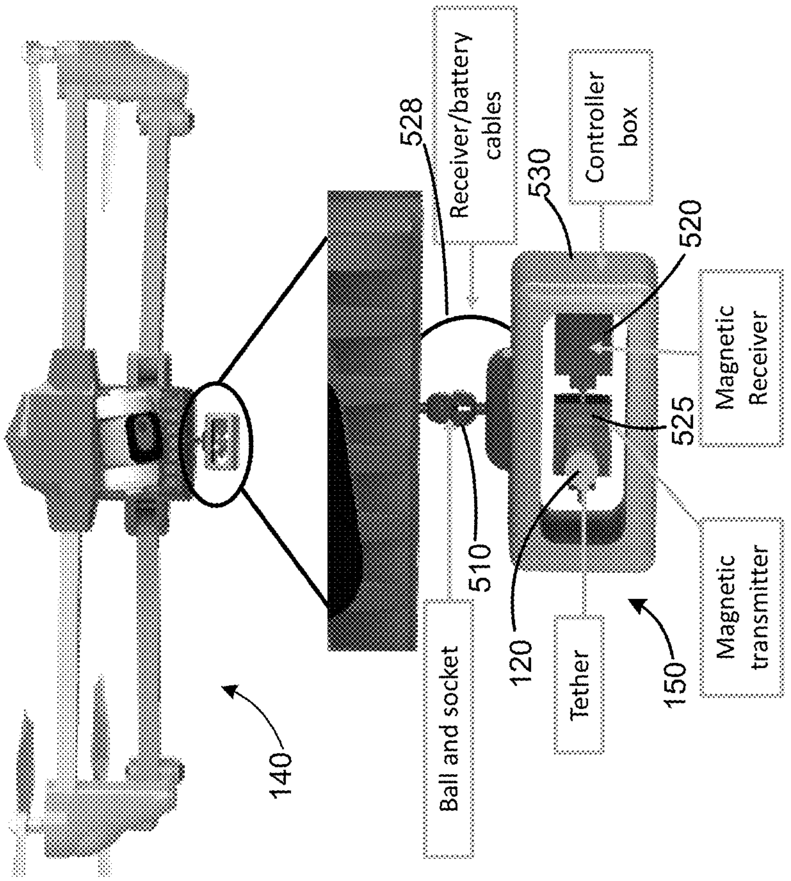

FIG. 5 depicts a slip-through connection mechanism according to an embodiment. Specifically, the drone 140 of FIG. 5 includes a tether connector 150 similar to that described above with respect to FIG. 4, except that the tether connector 150 is pivotably attached to the body of the drone 140 such as via a ball and socket mechanism 510. Advantageously, the pivotably attached tether connector 150 allows the drone 140 to tilt and rotate so as to avoid entanglement between the drone 140 and the tether 120. A magnetic receiver 520 is depicted as being attached to an inner surface of the cable pass-through box or ring 530, allowing an easy connection with a magnetic transmitter 525 and the drone's battery via receiver battery cables 528.

In some embodiments, the pivotal engagement mechanism (e.g., ball and socket joint) is further configured to slide back and forth from the drone, thereby allowing more movement of the drone with respect to the tether 120, even when attached to a docking point 130.

Figure 6:
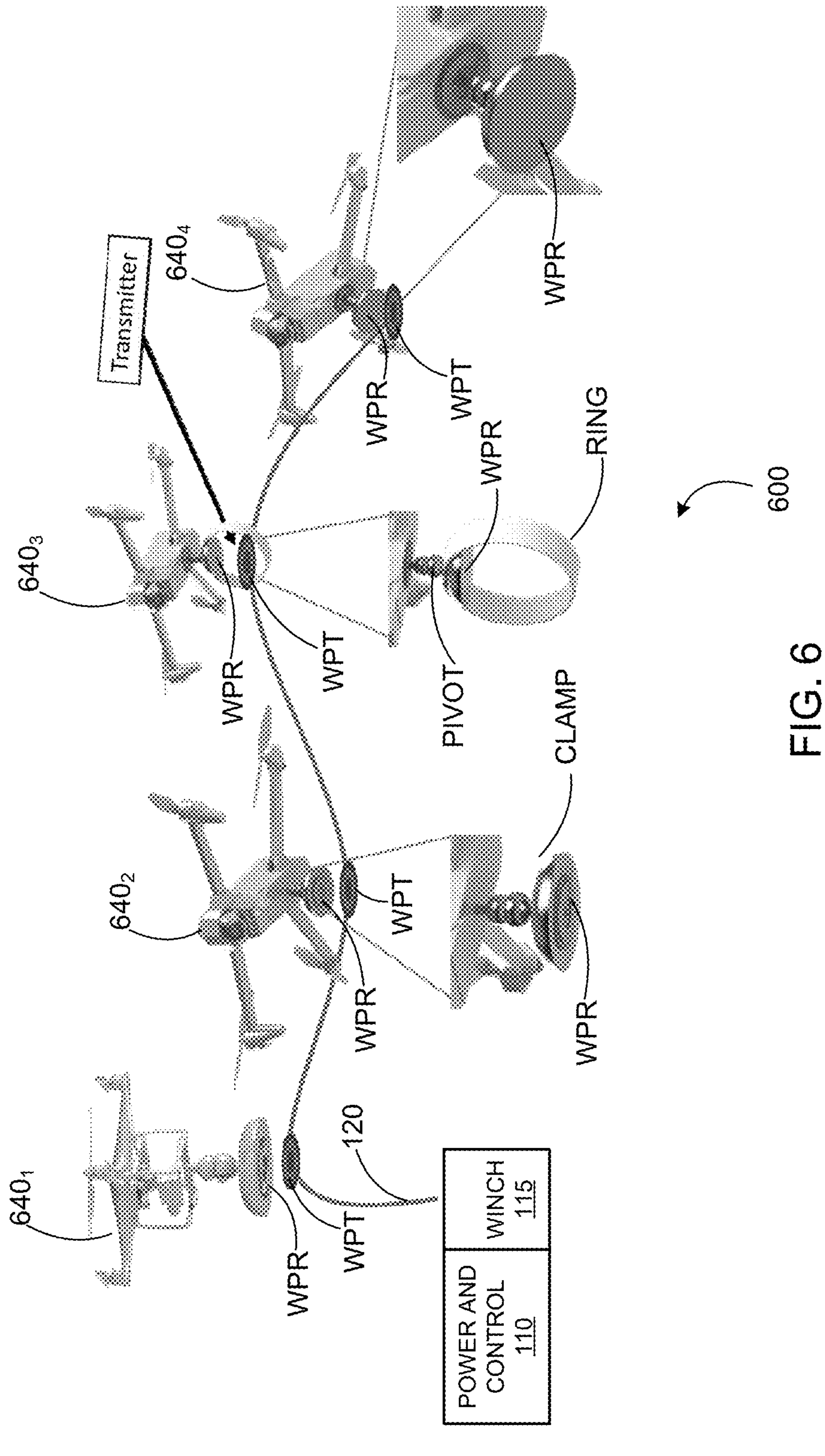
FIG. 6 depicts a tether system using wireless charging for different types of drones in accordance with an embodiment.

FIG. 6 depicts a tether system using wireless charging for different types of drones. Specifically, FIG. 6 depicts first drone type 640$_1$ and second drone type 640$_2$-640$_4$ sharing the same tether 120 and having wireless power receivers (WPRs) such as receiving coils for receiving power transmitted from wireless power transmitter (WPTs) such as transmitting coils at docking points 130 (wired and/or wireless. In various embodiments, spacing between the wireless power transmitters is maintained by securing them to fixed locations or points along the tether. There need not be any metal-metal connection between the drone and tether, such as where a wireless power transmitter (tether side) and receiver (drone side) are held flat and/or sufficiently close to each other such that wireless power transfer/charging operation is supported (advantageously, this mechanism allows weather-proof sealing of the various components). The may be performed via magnetic means such as described herein. Other embodiments contemplate a physical metal-metal connection for battery charging, etc. . . . That is, magnets and magnetic coupling are only one set of embodiments contemplated herein, with other non-magnetic embodiments used initiate/secure the electrical connections in appropriate conductor orientation.

It is noted that the drones 640 may be slidably attached to the tether 120 via a ring mechanism RING, clamp CLAMP, or other mechanism such as described above with respect to the other figures, which mechanism may optionally be connected to the drone 640 via a pivotal engagement mechanism PIVOT (e.g., ball and socket joint).

Various embodiments may be used for, illustratively, law enforcement surveillance wherein a mobile unit including the ground power and control source 110 and winch 115 arrive on location, deploy the tether 120 via a service drone at the end, and deploy additional roll-through or slip-through drones 140/640 via the tether to predetermined vantage points such as each side of a building so as to maintain surveillance of the building and/or occupants of the building. Permanent installations may be used at venues such as stadiums or event centers, which may benefit from overhead surveillance or videography. Maritime applications are contemplated in which a tether is anchored to the ocean floor with unmanned underwater vehicles (UUVs) moving along the tether to perform various activities at differing depths. Generally speaking, the various embodiments find utility in a number of applications (land, air, sea, undersea) and for different types of drones/robots/submersibles and other unmanned craft.

Advantageously, the various embodiments are well suited to managing tether cable length and slack since non-lead drones may freely move up and down (i.e., along) the tether.

The applications of multiple UAVs on a shared tether include persistent multi-perspective surveillance, maneuvering through complex environments (multiple UAVs able to control tether shape so it doesn't get tangled), disguising ground station location (controlling shape to imply tether trails off in false direction from adversary's perspective), and so on.

Various modifications may be made to the systems, methods, apparatus, mechanisms, techniques and portions thereof described herein with respect to the various figures, such modifications being contemplated as being within the scope of the invention. For example, while a specific order of steps or arrangement of functional elements is presented in the various embodiments described herein, various other orders/arrangements of steps or functional elements may be utilized within the context of the various embodiments. Further, while modifications to embodiments may be discussed individually, various embodiments may use multiple modifications contemporaneously or in sequence, compound modifications and the like.

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof. As such, the appropriate scope of the invention is to be determined according to the claims.

What is claimed is:

1. A drone tether cable, comprising:

power input connectors configured to be electrically coupled to a power source;

at least two power conductors electrically coupling the power input connectors to each of a plurality of docking points distributed along the tether cable;

each docking point comprising docking point coupling elements configured to engage with corresponding drone coupling elements;

each docking point comprising power connection elements configured to electrically cooperate with corresponding power connection elements of a drone, the orientation of the power connection elements being established by the orientation of the coupling elements;

wherein the docking point coupling elements and drone coupling elements comprise magnetic coupling elements; and wherein the drone coupling elements are mounted to a drone tether connector slideably cooperating with the tether cable.

2. The drone tether cable of claim 1, wherein the drone tether connector is configured to slideably cooperate with the tether cable via a ring mechanism.

3. The drone tether cable of claim 1, wherein each docking point further comprises data connection elements configured to electrically cooperate with corresponding data connection elements of the drone, the orientation of the data connection elements being established by the orientation of the magnetic coupling elements.

4. A tethered drone system comprising the drone tether cable of claim 1 and a drone tether connector configured to slideably cooperate with the tether cable.

5. The tethered drone system of claim 4, wherein the drone tether connector is configured to slideably cooperate with the tether cable via a ring mechanism.

6. The tethered drone system of claim 4, wherein each docking point further comprises data connection elements configured to electrically cooperate with corresponding data connection elements of the drone.

7. A drone tether connector comprising the features of the drone tether connector of claim 4.

* * * * *